Figure 1:
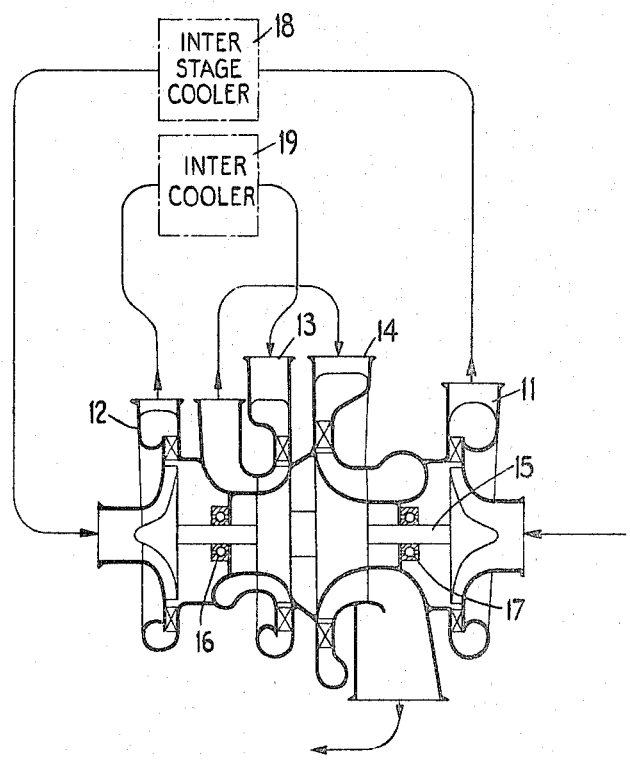

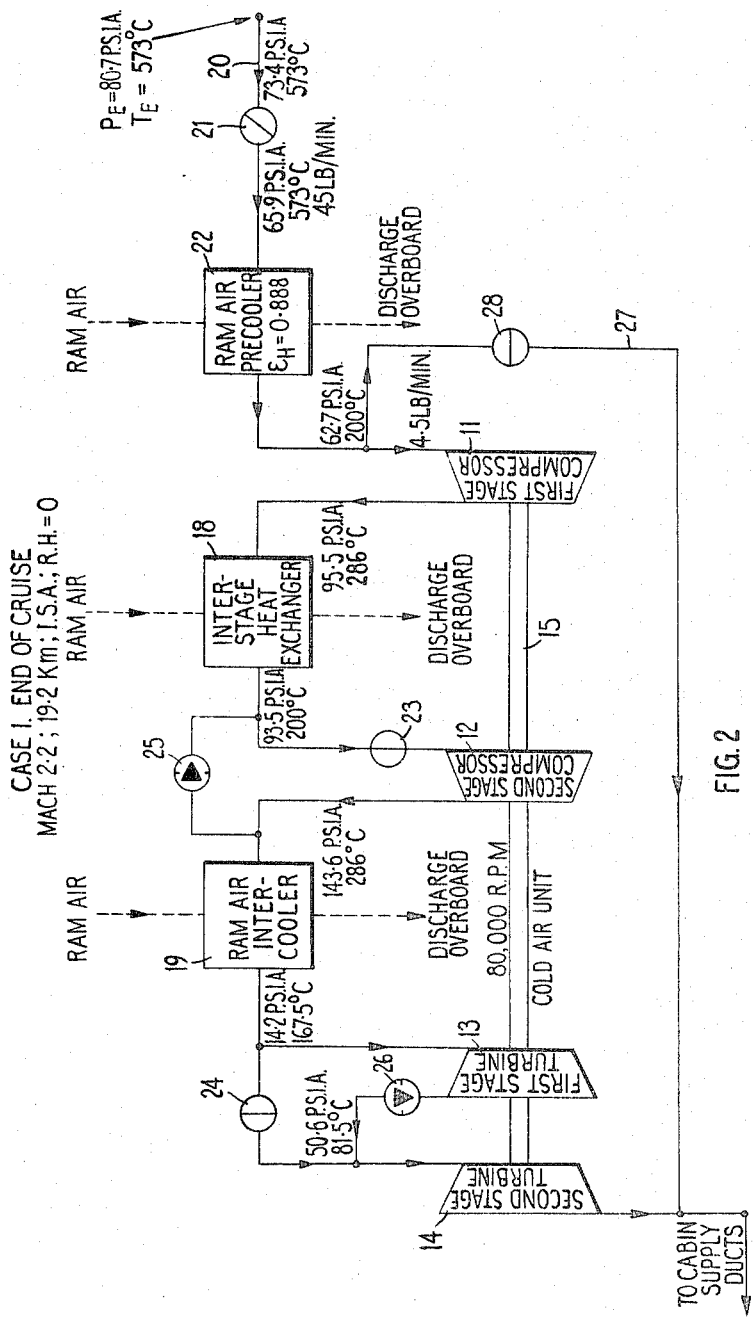

3,289,436
AIR CONDITION SYSTEMS
Henry W. Groves and Laurence Goodwin, Hatfield, England, assignors to Hawker Siddeley Dynamics Limited, Hatfield, England
Filed Apr. 29, 1965, Ser. No. 451,905
Claims priority, application Great Britain, Apr. 29, 1964, 17,891
9 Claims. (Cl. 62—402)

This invention relates to air conditioning systems, and especially those for high speed transport aircraft.

In order to provide cool air for the cabin and other purposes it is a known practice on aircraft to tap off air from the compressors of one or more gas turbine propulsions engines and cool this firstly in a heat exchanger, using ram air from outside the aircraft as the cooling medium, and then in a turbo expander. The ram air is itself normally too warm to bring the temperature down to the required level but in aircraft that fly at a moderate speed the desired final temperature can be achieved by a turbine the shaft power of which may be used, for example, to drive a ram air fan downstream of the heat exchanger. In more refined systems the turbine is part of a turbo-compressor unit and the air to be cooled is compressed before being admitted to the turbine, there being an intercooler between the compressor and turbine; the cooling medium of the intercooler can again be ram air.

With increasing aircraft speeds, the problems of designing and operating such a system become more acute both because the cooling load of the aircraft cabin is greater and because the ram air, used as the cooling medium, increases in temperature. With very high speed aircraft, the ram air temperature is so high that it has been proposed to cool the cabin air flow by means of heat exchangers using the engine fuel as the cooling medium. But a disadvantage of this scheme is that fuel temperatures are difficult to determine and vary during flight. For a new aircraft especially, the designer of the air conditioning system is faced with the problem that, if fuel is being used as a heat exchange medium, its temperature variations in flight can only be estimated roughly and the precise temperatures and pattern of variation may not finally become known until the aircraft has actually been in flying service for a considerable time.

It is an object of this invention to provide an air cooling system, suitable for aircraft in which the ram air temperature will be high, that eliminates the need for fuel to be used as a heat sink.

The present invention contemplates in its broadest aspect, an air conditioning system, for example for an aircraft, wherein the air is passed through low and high pressure compressor stages and thereafter through high and low pressure turbine stages, with intercooling, the turbine stages providing driving power to the compressor stages.

More specifically, there may be provided an aircraft air conditioning system wherein air tapped from turbo jet propulsion plant of the aircraft is compressed in a low pressure compressor stage, cooled by means of ram air, compressed in a high pressure compressor stage, again cooled by means of ram air, and then expanded through high and low pressure turbine stages.

Whereas the system can be operated with high and low pressure turbo-compressors running as separate units, with or without a coupling between the shafts of the two units, in the preferred arrangement all four of the compressor-turbine wheels are mounted on a single shaft supported in two bearings only, so that the unit is in the form of a double turbo-compressor which can be made quite compact.

Since the air supply is tapped off from the aircraft engines it will drop in pressure when the engines are throttled back, for example on descent at the end of cruising flight. Nevertheless it is essential to maintain an adequate pressure drop across the turbo-compressor for its satisfactory operation. Accordingly, it is an important further aspect of the invention that means are provided for bypassing stages of the unit, normally the high pressure compressor and the high pressure turbine, when necessary. The full turbo-compressor can be designed to accept air from the engine compressor at, say, 60 to 80 pounds per square inch absolute and when this pressure drops due to throttling back of the engines the high pressure stages will be cut out to enable the low pressure stages to operate satisfactorily with air at the lower entry pressure.

One scheme in accordance with the invention will now be described by way of example, with reference to the acompanying drawings, in which:

FIGURE 1 shows diagrammatically a turbo-compressor for use in an aircraft air-conditioning system, and FIGURE 2 is a flow sheet of the system.

FIGURE 1 of the drawings shows the turbo compressor unit with low and high pressure compressor stages 11, 12 and high and low turbine stages 13, 14 all mounted on a single common shaft 15 that is supported in two bearings 16, 17. The four rotors are well supported, two of the rotors representing the high and low pressure turbine stages 13, 14, being mounted between the two bearings 16, 17. An interstage cooler 18 is provided between the low and high pressure compressor stages; there is also an inter-cooler 19 between the high pressure compressor 12 and the high pressure turbine stage 13.

Referring now to FIGURE 2, this shows a flow sheet of the complete air cooling system. The incoming air, from the aircraft engine compressor tapping 20, passes through a flow control valve 21 and then through a precooler 22 before being admitted to the first stage compressor 11. Under cruise flight conditions, the air will be initially at a pressure of approximately 80 pounds per square inch absolute and a temperature in the region of 600° C., and the precooler 22 is designed to reduce the temperature to about 200° C. by heat exchange with ram air which, for the purpose of this example, is assumed to be at a temperature of 153° C.

The pressure of the air at entry to the compressor will have dropped to some extent and the compressor is designed to boost the air pressure up to about 95 pounds per square inch absolute in the first stage 11 and then up to about 140 pounds per square inch absolute in the second stage 12. The temperature increase due to compression in the first stage is removed by heat exchange with ram air in the inter stage cooler 18 so that the air entering the second stage is still at about 200° C. After compression, the air is expanded through the high and low pressure turbine stages 13, 14; the pressure drops to about 50 pounds per square inch absolute in the first stage 13 and down to 13.5 pounds per square inch absolute in the second stage. The temperature of the air leaving the high pressure compressor, say 286° C., is reduced to about 167° C. at entry to the turbine by heat exchange with ram air in the second inter-cooler 19. The temperature of the air leaving the first stage turbine will be just over 80° C., and will fall to −4.5° C. in the low pressure stage. The usual provision is made for mixing the final air with hot incoming air, taken for example from a point just upstream of the turbo-compressor entry via a line 27 and valve 28, to obtain any desired intermediate temperature.

Bypass valves 23, 24, and cooperating non-return valves 25, 26, are available to bypass the high pressure compressor and turbine stages when necessary. As already discussed, bypassing will ordinarily be carried out when the aircraft engines are throttled back during descent, so that the lower pressure incoming air will pass only through the first stage compressor 11 and thence to the low pressure turbine 14. The unit will thus continue to operate satisfactorily despite the reduced pressure drop across it.

While the system described is of particular benefit when applied in the air conditioning of very high speed aircraft, it use is not limited to this field. Quite apart from its advantages in overcoming difficulties due to high ram air temperatures the arrangement enables smaller heat exchangers to be employed and may therefore be of benefit even in aircraft flying at more moderate speeds. In the specific layout described, the use of two intercoolers, in association with the turbo-compressor unit, means that the temperatures are kept low enough for aluminium to be considered as the heat exchanger material, rather than steel, at least for the second intercooler.

We claim:

1. An air-conditioning system for an aircraft, comprising high and low pressure compressor stages and high and low pressure turbine stages all coupled to one another whereby the turbine stages provide driving power to the compressor stages, conduit means for feeding air through said low and high pressure compressor stages in succession, and then through said high and low pressure turbine stages in succession, and means mixing refrigerated air delivered from the low pressure turbine with air from upstream of the low pressure compressor to obtain the final temperature of the air output.

2. A system according to claim 1, and comprising bypass ducts and valve means enabling the high pressure compressor and turbine stages to be bypassed at will.

3. A system according to claim 1, wherein the high and low compressor stages and the high and low turbine stages are all combined into a single turbo-compressor machine.

4. A system according to claim 1, wherein the air feed to the low pressure compressor stage is tapped from turbo-jet propulsion plant of the aircraft.

5. A system according to claim 4, further comprising heat exchange means precooling the feed air by heat exchange with ram air before the feed air is passed to the low pressure compressor stage.

6. A system according to claim 1, further comprising an intercooler between the low and high pressure compressor stages, which intercooler is cooled by ram air.

7. A system according to claim 1, further comprising an intercooler between the high pressure compressor and turbine stages, which intercooler is cooled by ram air.

8. A turbo-compressor for an air-conditioning system, comprising a shaft with two bearings therefor spaced along the shaft, high and low pressure radial flow compressor stages mounted on said shaft, and high and low pressure radial flow turbine stages likewise mounted on said shaft, two of said stages being disposed on said shaft between said bearings while the other two stages are disposed, respectively, on the two ends of said shaft beyond said bearings.

9. A turbo-compressor according to claim 8 wherein the turbine stages are mounted on the shaft between the bearings.

References Cited by the Examiner

UNITED STATES PATENTS

| | | | |
|---|---|---|---|
| 2,453,923 | 11/1948 | Mayo | 62—402 |
| 2,485,509 | 10/1949 | Green | 62—402 |
| 2,526,103 | 10/1950 | Wood | 62—402 |
| 2,767,561 | 10/1956 | Seeger | 62—402 |
| 2,767,562 | 10/1956 | Hall | 62—402 |

FOREIGN PATENTS

| | | |
|---|---|---|
| 687,482 | 5/1964 | Canada. |
| 66,564 | 12/1956 | France. |

WILLIAM J. WYE, *Primary Examiner.*